US007704141B1

(12) United States Patent
Marks et al.

(10) Patent No.: US 7,704,141 B1
(45) Date of Patent: Apr. 27, 2010

(54) SLOT MACHINE GAME HAVING A PLURALITY OF WAYS FOR A USER TO OBTAIN PAYOUTS BASED ON THE SELECTION OF ONE OR MORE SYMBOL POSITIONS IN THE SYMBOL MATRIX ("LUCKY SPOT")

(75) Inventors: Daniel M. Marks, Nyack, NY (US); Anthony M. Singer, Ringwood, NJ (US); Howard M. Marks, Westport, CT (US)

(73) Assignee: WMS Gaming Inc., Waukegan, IL (US)

( * ) Notice: Subject to any disclaimer, the term of this patent is extended or adjusted under 35 U.S.C. 154(b) by 783 days.

(21) Appl. No.: 10/438,324

(22) Filed: May 15, 2003

Related U.S. Application Data

(60) Provisional application No. 60/380,485, filed on May 15, 2002.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/20; 463/21; 463/22; 463/16; 463/29

(58) Field of Classification Search ............. 463/16–22, 463/25–29, 43, 46, 47
See application file for complete search history.

(56) References Cited

U.S. PATENT DOCUMENTS 4,648,600 A * 3/1987 Olliges ........................ 463/20
5,833,537 A 11/1998 Barrie ......................... 463/21
5,967,896 A * 10/1999 Jorasch et al. ................ 463/25
6,056,642 A 5/2000 Bennett ....................... 463/20
6,089,977 A * 7/2000 Bennett ....................... 463/20
6,093,102 A * 7/2000 Bennett ....................... 463/20
6,117,009 A * 9/2000 Yoseloff ...................... 463/20
6,190,254 B1 2/2001 Bennett ....................... 463/13
6,251,013 B1 * 6/2001 Bennett ....................... 463/13
6,270,411 B1 8/2001 Gura et al. .................... 463/20
6,290,600 B1 9/2001 Glasson ....................... 463/20
6,311,976 B1 * 11/2001 Yoseloff et al. .......... 273/138.2

(Continued)

FOREIGN PATENT DOCUMENTS

EP 1 150 261 A2 10/2001

(Continued)

*Primary Examiner*—Dmitry Suhol
*Assistant Examiner*—Binh-An D Nguyen
(74) *Attorney, Agent, or Firm*—Nixon Peabody LLP

(57) ABSTRACT

A slot machine enables the selection of one or more symbol positions in a symbol matrix to provide additional and/or enhanced awards ("Lucky Spot"). The preferred embodiment of the present invention offers a new "wandering" wild symbol with an associated multiplier value, as follows:

During each spin, the slot game randomly selects one of fifteen symbol positions as the Lucky Spot;

A multiplier value is associated with the Lucky Spot from within a range of 2 to 5;

The Lucky Spot and associated multiplier value are then displayed in the symbol matrix in the selected symbol position;

After each spin, the slot game issues Lucky Spot awards based on the winning combinations using the Lucky Spot; and Alternatively, the Lucky Spot concept can also be implemented in various alternative methods.

43 Claims, 9 Drawing Sheets

U.S. PATENT DOCUMENTS 6,439,993 B1 * 8/2002 O'Halloran .................. 463/16
6,517,432 B1 2/2003 Jaffe ........................... 463/16
6,551,187 B1 * 4/2003 Jaffe ........................... 463/20
6,565,433 B1 5/2003 Baerlocher et al. ............ 463/20
6,604,740 B1 * 8/2003 Singer et al. ................ 273/292
6,638,169 B2 10/2003 Wilder et al. ................. 463/35
6,648,758 B2 * 11/2003 Bennett et al. ................ 463/20
6,731,313 B1 * 5/2004 Kaminkow ................. 715/839
6,780,109 B2 8/2004 Kaminkow .................. 463/20
6,805,349 B2 10/2004 Baerlocher et al. ....... 273/138.2
6,805,632 B2 10/2004 Suda ........................... 463/25
6,805,633 B2 10/2004 Hein, Jr. et al. ............... 463/35
6,837,790 B1 1/2005 Kaminkow .................. 463/31
6,843,725 B2 1/2005 Nelson ........................ 463/40
6,848,996 B2 2/2005 Hecht et al. ................... 463/35
6,866,583 B2 3/2005 Glavich et al. ................ 463/20
6,893,342 B1 * 5/2005 Singer et al. .................. 463/20
6,905,406 B2 6/2005 Kaminkow et al. ........... 463/20
6,918,832 B2 7/2005 Baerlocher et al. ............ 463/20
6,921,335 B2 7/2005 Rodgers et al. ............... 463/30
6,935,947 B1 * 8/2005 Singer et al. .................. 463/16
6,939,228 B2 * 9/2005 Shimizu ...................... 463/20
6,968,063 B2 11/2005 Boyd .......................... 381/57
6,981,635 B1 1/2006 Hughs-Baird et al. ....... 235/375
7,195,559 B2 3/2007 Gilmore et al. ............... 463/20
2002/0025846 A1 * 2/2002 Bennett et al. ................ 463/20
2002/0025849 A1 2/2002 Olive .......................... 463/29
2002/0039918 A1 4/2002 Anderson et al. ............. 463/16
2002/0047238 A1 4/2002 Ainsworth et al. .......... 273/292
2002/0052233 A1 5/2002 Gauselmann ................ 463/20
2002/0082075 A1 6/2002 Meyer ......................... 463/20
2003/0013517 A1 1/2003 Bennett et al. ................ 463/25
2003/0054874 A1 3/2003 Kaminkow .................. 463/20
2003/0057645 A1 3/2003 Baerlocher et al. ....... 273/138.2
2003/0060267 A1 3/2003 Glavich et al. ................ 463/20
2003/0064779 A1 4/2003 Suda ........................... 463/20
2003/0064802 A1 4/2003 Rodgers et al. ............... 463/30
2003/0069062 A1 4/2003 Shimizu ...................... 463/20
2003/0073490 A1 4/2003 Hecht et al. ................... 463/35
2003/0073491 A1 4/2003 Hecht et al. ................... 463/35
2003/0100359 A1 5/2003 Loose et al. .................. 463/20
2003/0186737 A1 10/2003 Bennett et al. ................ 463/20
2003/0203752 A1 10/2003 Kaminkow et al. ........... 463/20
2003/0203753 A1 10/2003 Muir et al. .................... 463/20
2003/0207709 A1 11/2003 Paotrakul ..................... 463/20
2003/0211881 A1 11/2003 Walker et al. ................. 463/20
2004/0038730 A1 2/2004 Suda ........................... 463/20
2004/0048646 A1 3/2004 Visocnik ...................... 463/16
2004/0048652 A1 3/2004 Ching et al. .................. 463/20
2004/0053676 A1 3/2004 Rodgers ...................... 463/20
2004/0053695 A1 3/2004 Mattice et al. ................ 463/42
2004/0072612 A1 4/2004 Rodgers et al. ............... 463/20
2004/0082388 A1 4/2004 Simsek et al. ................. 463/43
2004/0097280 A1 5/2004 Gauselmann ................ 463/16
2004/0137982 A1 7/2004 Cuddy et al. .................. 463/20
2004/0138889 A1 7/2004 Gilboy et al. ............... 704/270
2004/0147316 A1 7/2004 Nagano ....................... 463/35
2004/0229679 A1 11/2004 Anderson et al. ............. 463/20
2005/0020344 A1 1/2005 Kaminkow .................. 463/16
2005/0049030 A1 3/2005 Tachikawa ................... 463/20
2005/0049035 A1 3/2005 Baerlocher et al. ............ 463/20
2005/0054412 A1 3/2005 Gauselmann ................ 463/16
2005/0064924 A1 3/2005 Glavich et al. ................ 463/13
2005/0101369 A1 5/2005 Meyer ......................... 463/16
2005/0101380 A1 5/2005 Glavich et al. ................ 463/25
2005/0148384 A1 7/2005 Marks et al. .................. 463/20
2005/0164775 A1 7/2005 Rodgers et al. ............... 463/20
2005/0282607 A1 12/2005 Gauselmann ................ 463/16
2006/0058097 A1 3/2006 Berman et al. ................ 463/20

FOREIGN PATENT DOCUMENTS

EP 1 150 261 A3 1/2005
GB 2 092 797 A 8/1982
GB 2 096 376 A 10/1982
GB 2 097 160 A 10/1982
GB 2 119 991 A 11/1983
GB 2 137 392 A 10/1984

* cited by examiner

FIGURE 1
Little Green FROG
NO SWIMMING!
WILD
X2
Game Over
CREDITS 455
25¢
LINES 9
BET 5
TOTAL 45
PAID 0
CASH OUT
PAYS
HELP
SELECT LINES
BET PER LINE
MAX BET
SPIN

FIGURE 2
Little Green FROG
Line Win Pays 15
Game Pays 30
Play Max Credits
CREDITS 455
25¢
LINES 9
BET 5
TOTAL 45
PAID 30
CASH OUT
PAYS
HELP
SELECT LINES
BET PER LINE
MAX BET
SPIN
WILD
X2

FIGURE 5
Little Green FROG
45
CREDITS
NO SWIMMING!
SNACK TIME!
WILD
X2
CREDITS 635
25¢
LINES 9
BET 5
TOTAL 45
PAID 180
CASH OUT
PAYS
HELP
SELECT LINES
BET PER LINE
MAX BET
SPIN

FIGURE 8
Congratulations!
You have reached the pond
900
Bonus Credits
JUMP
PAID
1992
JUMP
CREDITS
310
JUMP

SLOT MACHINE GAME HAVING A PLURALITY OF WAYS FOR A USER TO OBTAIN PAYOUTS BASED ON THE SELECTION OF ONE OR MORE SYMBOL POSITIONS IN THE SYMBOL MATRIX ("LUCKY SPOT")

RELATED APPLICATIONS

This application claims priority from U.S. Provisional Application No. 60/380,485, filed May 15, 2002, which is incorporated herein by reference.

BACKGROUND OF THE INVENTION

1. Field of Invention

The present invention relates generally to payout methods in a mechanical, an electro-mechanical and/or computer-based slot machine-like games-of-chance and, more particularly, to a method, an apparatus, and a computer readable medium storing computer-executable instructions for providing awards based upon the selection of one or more symbol positions within the symbol matrix to provide additional and/or enhanced awards ("Lucky Spot").

2. Background Description

To play a slot machine a player deposits money in the form of coins, gaming tokens or paper currency either into a coin head or bill acceptor ("the coin-in"). The coins and gaming tokens are collected in a reservoir inside the gaming machine ("the hopper") while the paper currency is collected in the bill acceptor inside the gaming machine. If the coins, gaming tokens or paper currency are validated as authentic, the player accrues the appropriate number of playing units ("credits") on a credit meter on the gaming machine depending on the denomination of the wager as set on the gaming machine. For example, a twenty-five cent gaming machine will accrue four credits for each dollar deposited into the gaming machine by way of the coin head or the bill acceptor.

After accruing credits on the credit meter, the player determines how many credits he wishes to wager on the next spin of the slot reels ("total bet") and then spins the reels by pressing the spin button or by pulling a handle. When the reels stop spinning, symbols are displayed on the slot reels ("symbol matrix"). The player then collects credits for predetermined symbol combinations ("winning combinations"), if any, according to a pre-determined schedule ("pay table"):

Symbol Matrix. Slot symbols are displayed on 3 or more slot reels (also called "columns") placed adjacent to each other. Each column contains at least 3 rows, with a symbol in each row. The resulting matrix of symbols ("symbol matrix") ranges from 3 columns by 3 rows with 9 total symbols to 5 columns by 3 rows with 15 total symbols. Within the symbol matrix, positions on the slot reels may be referred to according to column, from left to right, and row, from the top to bottom ("symbol positions"). For example: symbol position 1/2 is located in column 1 (i.e., left-most column) and row 2 (i.e., middle row).

Winning Combinations. Players collect credits for predetermined winning symbol combinations that appear in specific locations ("pay lines") on the slot reels. Winning combinations typically require that three or more of the same symbols appear adjacent to each other starting from the leftmost position of a pay line ("line pays"). For example: a player may collect a line pay if 3 Banana symbols appeared in symbol positions 1/1, 2/1, 3/1 on a pay line using symbol positions 1/1, 2/1, 3/1, 4/1, and 5/1.

Alternatively, players may also collect credits for predetermined winning combinations that appear anywhere on a pay line ("line scatter pays") or anywhere on the slot reels ("reel scatter pays"). For example, a player may collect a line scatter pay if 3 Banana symbols appeared in symbol positions 1/1, 3/1, 5/1 on a pay line using symbol positions 1/1, 2/1, 3/1, 4/1, and 5/1; and collect a reel scatter pay if 3 Banana symbols appeared anywhere on the slot reels.

Pay Table. Credits are awarded to the player for each winning symbol combination based on a predetermined schedule ("pay table"). For line pays and line scatter pays, the number of credits wagered on the winning pay line multiplies the number of credits indicated by the pay table. For example, a player may wager two credits each on five pay lines, spin the reels, and collect twice the amount indicated on the pay table for a line pay or line scatter pay appearing on any of the five played pay lines. For reel scatter pays, the total number of credits wagered multiplies the number of credits indicated by the pay table. For example, a player may wager ten total credits, spin the reels, and collect twice the amount indicated on the pay table for a reel scatter pay appearing on anywhere on the slot reels.

Following any type of pay (e.g., line pays, line scatter pays and reel scatter pays), the credits won are added to the player's balance of credits shown in the credit meter. As long as the player has credits on the credit meter, the player may continue to play the gaming machine. In addition, the player may also: collect the remaining balance of credits by pressing a Cash Out button the gaming machine; view the rules of the game by pressing the Help button before any spin; and/or view the game's pay table by pressing the Pays button before any spin.

Thus, a conventional slot machine only issues awards for the winning combinations described above, according to a fixed pay table. As a result of this limitation:

Players suffer from the boredom of playing "new" games that really use the same "old" awards;

Casinos suffer from the players' dissatisfaction with the casino's game selection as they cannot distinguish their game offerings from other casinos; and Game manufacturers suffer declining orders as they cannot distinguish their product line from the other manufacturers.

It is an object of the present invention to address the limitations associated with conventional slot machines by creating additional and/or enhanced awards based upon the selection of one or more symbol positions from the symbol matrix ("Lucky Spot"). The Lucky Spot concept creates a slot game with a wider variety of awards which benefits all parties: the game manufacturer adds a unique product to their sales line; the casino attracts and retain players interested in playing an innovative slot game; and the player enjoys a new method of receiving an award.

SUMMARY OF THE INVENTION

The present invention includes a variety of methods of play that can be programmed on an electronic video slot machine to enable the selection of one or more symbol positions from the symbol matrix to provide additional and/or enhanced awards ("Lucky Spot").

In a preferred embodiment of the present invention, the Lucky Spot provides a new type of award—"wandering" wild multiplier—that changes location and value with every spin, as follows:

There is one symbol position selected as the Lucky Spot;

The Lucky Spot is a "Wild" symbol;

The Lucky Spot has a multiplier value from 1 to 10;

The Lucky Spot location is indicated by a symbol, text, highlight or outline drawn around the edges of the symbol position, and/or animated sequence;

During each spin, the Lucky Spot randomly "wanders" from symbol position to symbol position;

At the end of each spin, the Lucky Spot stops on one of the fifteen symbol positions in the symbol matrix, as follows:

Symbol Position 1/1 . . . 6.67%
Symbol Position 2/1 . . . 6.67%
Symbol Position 3/1 . . . 6.67%
Symbol Position 4/1 . . . 6.67%
Symbol Position 5/1 . . . 6.67%
Symbol Position 1/2 . . . 6.67%
Symbol Position 2/2 . . . 6.67%
Symbol Position 3/2 . . . 6.67%
Symbol Position 4/2 . . . 6.67%
Symbol Position 5/2 . . . 6.67%
Symbol Position 1/3 . . . 6.67%
Symbol Position 2/3 . . . 6.67%
Symbol Position 3/3 . . . 6.67%
Symbol Position 4/3 . . . 6.67%
Symbol Position 5/3 . . . 6.67%

At the end of each spin, the Lucky Spot is randomly associated with a multiplier, as follows:

Multiplier ×1 . . . 20%
Multiplier ×2 . . . 35%
Multiplier ×3 . . . 15%
Multiplier ×4 . . . 10%
Multiplier ×5 . . . 5%
Multiplier ×6 . . . 5%
Multiplier ×7 . . . 4%
Multiplier ×8 . . . 3%
Multiplier ×9 . . . 2%
Multiplier ×10 . . . 1%

The Lucky Spot multiplies the value of any line pay that uses the Lucky Spot symbol to form a winning combination. For example, using the numbers 1 to 14 to represent the symbol set; the Lucky Spot is located at symbol position 1/1; the Lucky Spot multiplier displays "3;" and the reels of the game display the following symbols:

| | | | | |
|---|---|---|---|---|
| **LS** | 1 | 6 | 6 | 6 |
| 4 | **11** | 4 | 3 | 5 |
| 6 | 6 | **11** | 4 | 6 |

(Lucky Spot indicated by LS.)
(Winning Selected Symbol combination in bold.)

(Lucky Spot Indicated by LS.)

(Winning Selected Symbol Combination in Bold.)

In this example, the Lucky Spot acts as an 11 symbol to form the 11-11-11 winning combination. The Lucky Spot then multiplies the pay out for 11-11-11 by 3 since the Lucky Spot has a 3× multiplier.

The Lucky Spot may issue awards for one or more winning combinations at the same time. For example, using the numbers 1 to 12 to represent the symbol set; the Lucky Spot is located at symbol position 1/3; the Lucky Spot multiplier displays "3;" and the reels of the game display the following symbols:

| | | | | |
|---|---|---|---|---|
| 2 | 3 | **11** | 4 | 6 |
| 4 | **11** | 4 | 3 | 5 |
| **LS** | **6** | **6** | **6** | **6** |

(Lucky Spot indicated by LS.)
(Winning line pay combination in bold.)

(Lucky Spot Indicated by LS.)

(Winning Line Pay Combination in Bold.)

In this example, the Lucky Spot acts as an 11 symbol to form the 11-11-11 winning combination and as a 6 symbol to form the 6-6-6-6-6 winning combination. The Lucky Spot then multiplies the pay out for each combination by 3 since the Lucky Spot has a 3× multiplier.

The preferred embodiment of the present invention, therefore, offers a new "variable" award that changes from spin to spin, with each Lucky Spot offering a different opportunity for an additional award.

Alternatively, the present invention allows for many alternative embodiments, including but not limited to the following:

Any number of Lucky Spots. The present invention allows for selecting any number of Lucky Spots on each spin, with the same or different number of Lucky Spots from spin to spin. The number of Lucky Spots may vary according one or more factors, such as amount of pay lines wagered upon, amount of bet per line, amount of the total wager, player input and/or decision, any other factor, or randomly.

Any method of selection. The present invention allows for the selection of Lucky Spots by: player input and/or decision; third party input and/or decision; external factors, such as time, weather, date; number of pay lines selected, bet per pay line, total wager, and/or other wagering option; at random; and/or any other method. Lucky Spots selected by different methods may result in different outcomes, such as amounts or types of awards.

Length of selection. The present invention allows for selecting Lucky Spots for a single spin, a group of spins, every other spin, or any other number/grouping/spacing of spins. Lucky Spots selected for different number/grouping/spacing of spins may result in different outcomes, such as amounts or types of awards.

Any probability of selection. The present invention allows for selecting Lucky Spots using any probability of selection. For example, Symbol Position 1 may be selected 5%, Symbol Position 2 selected 10%, Symbol Position 3 selected 2%, through Symbol Position N selected X % of the time. The probability of each symbol position's selection may also result different outcomes, such as amounts or types of awards.

Any method of display. The present invention allows for indicating the Lucky Spots in any manner, including a symbol, text, highlight or outline drawn around the edges of the symbol positions, and/or animated sequence. The Lucky Spots may be indicated at any point during play, including before, during and/or after each spin. In addition, Lucky Spots may appear and then disappear as a result of the symbols displayed on the reels, a player's interaction and/or randomly.

Any trigger for award. The present invention allows for any trigger event to issue Lucky Spots awards. For example,

- Lucky Spot awards may be issued for any line pay, scatter pay and/or other pay using the Lucky Spot, any pay not using the Lucky Spot, any pay appearing adjacent to a Lucky Spot, all symbols in the column and/or row shared with the Lucky Spot, and/or any other trigger for awards based on the Lucky Spot.
- Any type of award. The present invention allows each Lucky Spot to provide one or more types of awards, such as credits, multipliers, wilds, free games, and/or bonus features and events. For example, a slot game with 4 Lucky Spot symbols may be played as follows: Lucky Spot 1 has a multiplier value; Lucky Spot 2 provides a wild, Lucky Spot 3 issues free games and Lucky Spot 4 awards bonus credits.
- Any amount of award. The present invention allows each Lucky Spot to issue any amount of award, including number of credits or free games, multiplier values, and/or types of bonus features and events. For example, Lucky Spot has a multiplier that varies from 2 to 100.

All of these alternative embodiments rely upon the underlying Lucky Spot concept that enables the selection of one or more symbol positions from a symbol matrix to provide additional and/or enhanced awards ("Lucky Spot").

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The Detailed Description including the description of a preferred structure as embodying features of the invention will be best understood when read in reference to the accompanying figures wherein.

NOTATIONS AND NOMENCLATURE

Figure 1:
FIG. 1 shows an illustrative example of a non-winning outcome during a typical game.
Figure 2:
FIG. 2 shows an illustrative example of a winning outcome using the Lucky Spot during a typical game.
Figure 3:
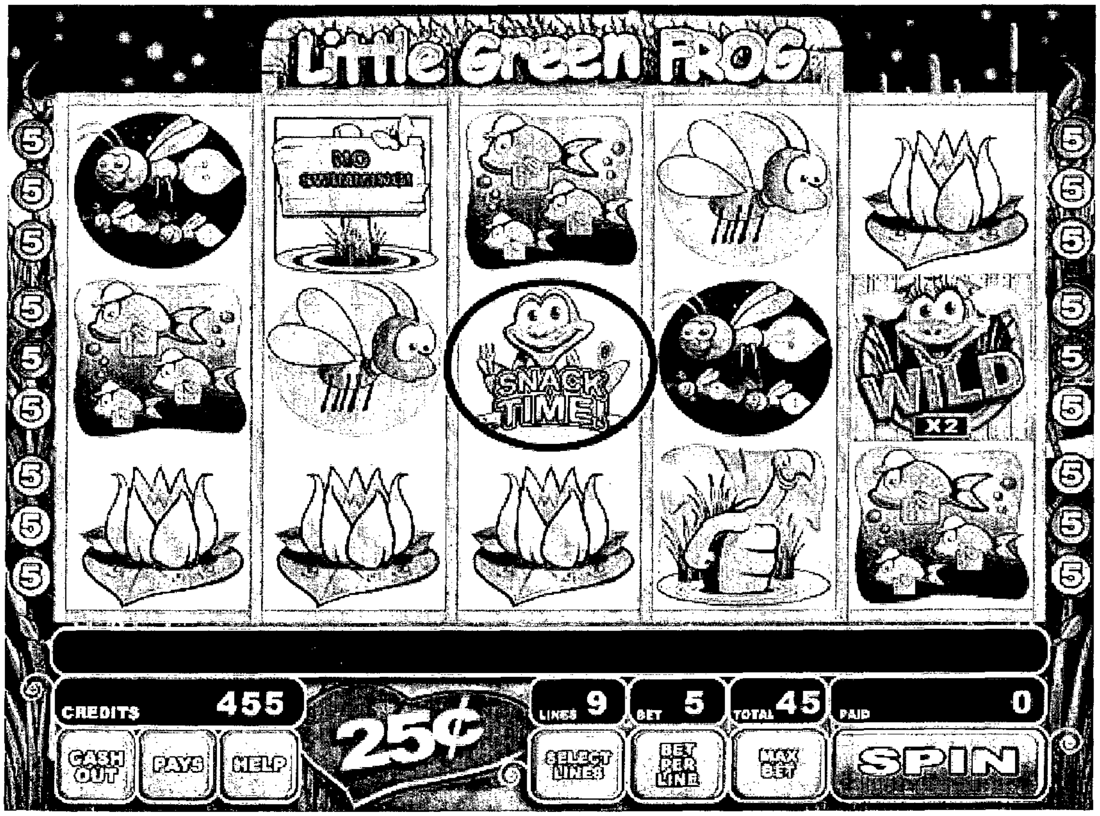
FIG. 3 illustrates a trigger state for a first bonus game that may be played during a typical game.
Figure 4:
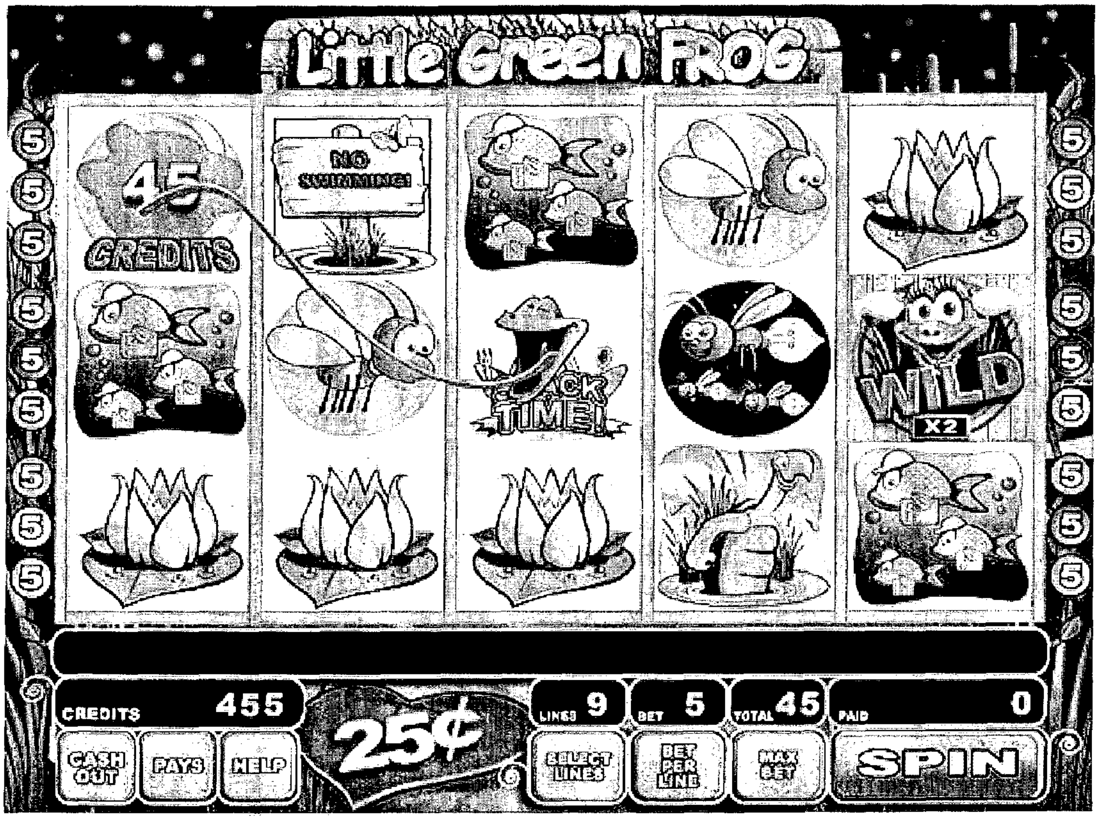
FIG. 4 illustrates an intermediate stage of a first bonus game that is triggered during a typical game.
Figure 5:
FIG. 5 illustrates a final stage of a first bonus game that is triggered during a typical game.
Figure 6:
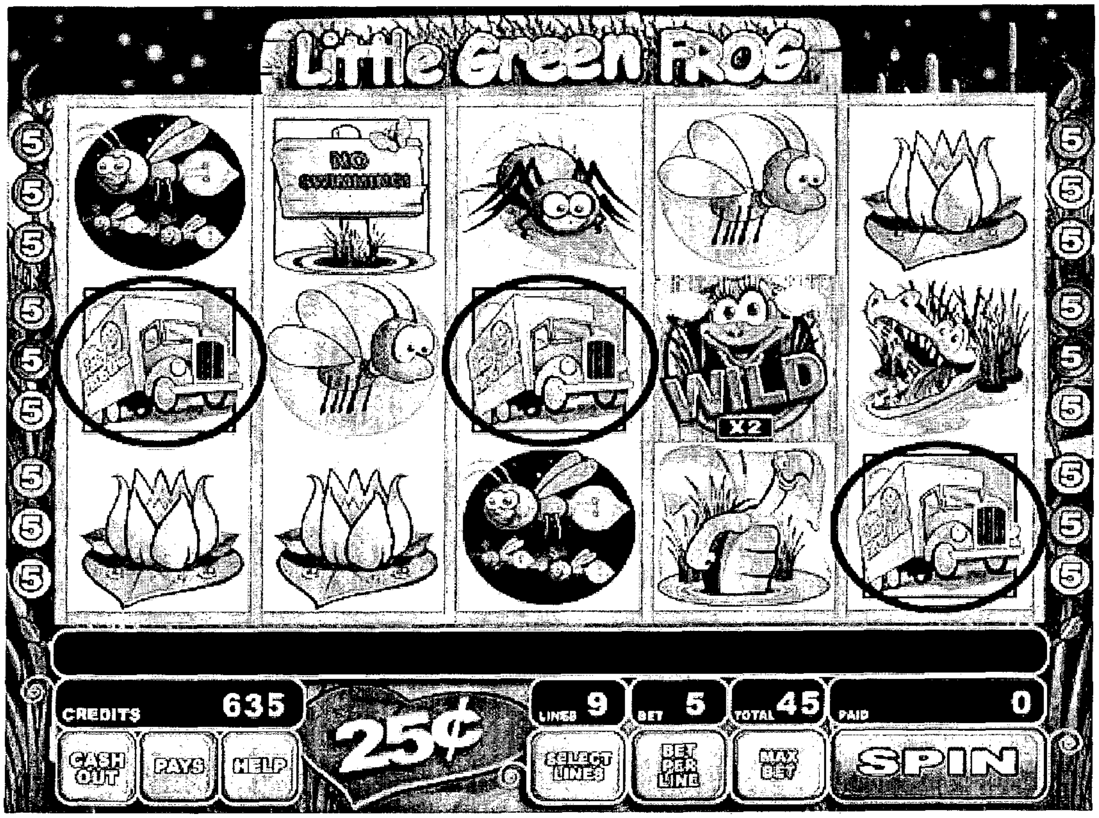
FIG. 6 illustrates a trigger state of a second bonus game that may be played during a typical game.
Figure 7:
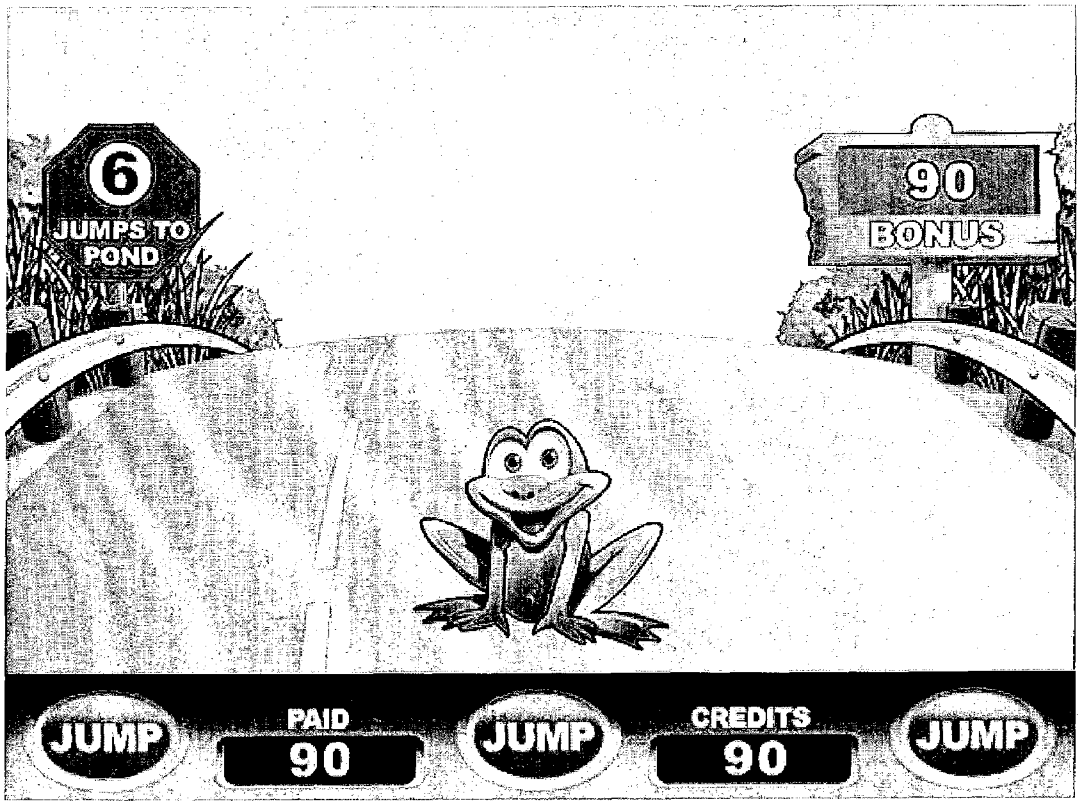
FIG. 7 illustrates an intermediate stage of a second bonus game that is triggered during a typical game.
Figure 8:
FIG. 8 illustrates a final stage of a second bonus game that is triggered during a typical game.
Figure 9:
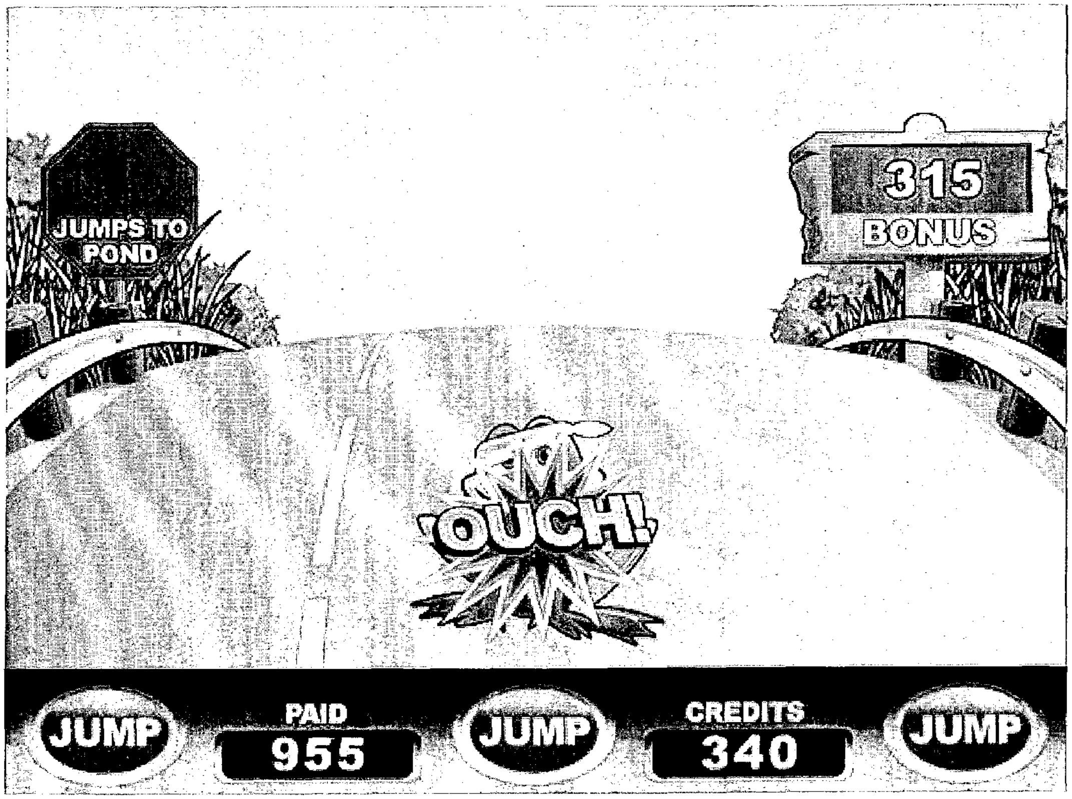
FIG. 9 illustrates an alternative final stage of a second bonus game that is triggered during a typical game.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine and/or manual operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF A PREFERRED EMBODIMENT OF THE INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The preferred embodiment of the present invention includes the play of the base game and additional bonus features, including new Wild symbols and Scatter pay features, as described below:

Base Game. To play the base game, the player establishes a pool of credits, selects pay lines, sets the wager per pay line, spins the reels, displays the Lucky Spot, and collects credits for winning symbol combinations and bonus features.

Video Display. In a preferred embodiment of the present invention, the slot game has a five reel display using a five column by three row matrix. Alternatively, the game could utilize any number of columns and reels, such as a 3 column by 3 row matrix.

Buttons. In the preferred embodiment of the present invention, a set of buttons are mounted on the button panel and are used by the player to control the functions of the slot game. These buttons include Select Pay Lines, Bet Per Line, Max Bet, Spin Reels, Pay Table, and Help. Any or all of these control buttons may be displayed on the video display and/or buttons hard wired to the gaming device. If necessary, any number of buttons may be added to further facilitate control of the games Meters. In the preferred embodiment of the present invention, a set of meters are shown on the video display screen to display the salient information for the game, including Number of Pay Lines, Amount Bet Per Line, Total Bet, and Paid. The Number of Pay Lines meter is associated with the Select Pay Lines button and displays the current number of Pay Lines Selected. The Amount Bet Per Line meter is associated with the Bet Per Line button and displays the number of credits wagered per pay line. The Total Bet meter displays the cumulative value of the Number of Pay Lines and Amount Bet Per Line; and the Paid meter displays the number of credits won on the last spin. In addition, the game has a Credits meter which displays the total number credits remaining in the credit pool.

Credit Pool. In a preferred embodiment of the present invention, the player deposits coins, tokens or paper currency into the coin head slot or a paper currency bill acceptor to establish a credit pool. The amount of the pool of credits is displayed to the player on the Credits meter. The pool of credits increases and decreases according to the player's wins or losses and may be supplemented, if necessary, by the player by additional deposits of coins, tokens or paper currency.

Select Pay Lines. In a preferred embodiment of the present invention, the slot game has a plurality of pay lines upon which to wager. The pay lines wagered on by the player activate in a predetermined order. For example, the slot game may utilize nine pay lines of which the player's first wager is applied to pay line 1, the second wager is applied to pay line 2, the third wager is applied to pay line 3, and so on up until the ninth wager is applied to pay line 9. However, the games may utilize any other order of pay line activation and fewer or greater than nine pay lines may be used.

Bet Per Line. In a preferred embodiment of the present invention, the player sets the value of the wager on each pay line; the same amount is wagered on each pay line. Alternatively, the player could be allowed to make wagers of different amounts on each pay line. The total amount wagered is determined by summing the amounts wagered on each pay line.

Determine and Display Lucky Spot. In a preferred embodiment of the present invention, the slot game randomly determines the Lucky Spot. Before each spin, one symbol position is randomly selected from the symbol matrix. The Lucky Spot is assigned a multiplier from 2 to 5, according to a predetermined probability table. The Lucky Spot and then associated multiplier are then displayed together on the selected symbol position in the symbol matrix.

Spin Reels. In a preferred embodiment of the present invention, the player then causes the slot machine to operate by effecting a "spin" of the reels. This can be done in any suitable manner, such as the player pressing a "spin" button on the machine's button panel and watching a video simulation of a reel slot machine.

Symbol Set. In a preferred embodiment of the present invention, the symbol set includes fifteen symbols. For each spin, the machine randomly displays three symbols from the symbol set on each reel. A common theme can be used for the symbols, and in one embodiment, the symbols are related to a Frog and Pond theme. However, any suitable symbols may be used, including the traditional fruit symbols that commonly appear on other slot machines. Furthermore, fewer or greater than fifteen symbols may be used as a symbol set.

Winning Symbol Combinations. In a preferred embodiment of the present invention, the player is paid for predetermined winning combinations of symbols that appear on an active pay line. Each winning combination may involve three or more of the same symbols that appear adjacent to each other reading from the leftmost position of a pay line to the right. Each winning combination pays the amount indicated on the game's pay table times the amount wagered on that pay line. Alternatively, any desired group of symbols may be designated as winning symbol combinations and fewer or greater than three symbols could be designated as winning symbol combinations.

Base Game Example. Sam Slotsky is standing in front of a nickel-denomination version of the preferred embodiment of the present invention. Sam sees a 5-reel slot game on the video display.

Below the game on the button panel are seven buttons: Select Pay Lines, Bet Per Line, Bet Max, Spin Reels, Pay Table, Help and Cash Out. In addition, there are also four meters on the video screen display below the game: Number of Pay Lines, Amount Bet Per Line, Total Bet and Paid.

Sam presses the Pay Table button to view the pays for winning combinations. Using the numbers 1 to 14 to represent the symbol set, with 12 as the Wild symbol, and 13 and 14 as the scatter symbols. The pay table for symbols to 12 reads as follows (refer to the Bonus Features section below for more details on Wild symbols and Scatter Symbols):

| | | | | | |
|---|---|---|---|---|---|
| 12-12-12-12-12 | 5000 | 12-12-12-12 | 500 | 12-12-12 | 50 |
| 11-11-11-11-11 | 2000 | 11-11-11-11 | 250 | 11-11-11 | 50 |
| 10-10-10-10-10 | 400 | 10-10-10-10 | 150 | 10-10-10 | 25 |
| 9-9-9-9-9 | 300 | 9-9-9-9 | 150 | 9-9-9 | 25 |
| 8-8-8-8-8 | 200 | 8-8-8-8 | 100 | 8-8-8 | 20 |
| 7-7-7-7-7 | 150 | 7-7-7-7 | 100 | 7-7-7 | 20 |
| 6-6-6-6-6 | 100 | 6-6-6-6 | 50 | 6-6-6 | 15 |
| 5-5-5-5-5 | 100 | 5-5-5-5 | 50 | 5-5-5 | 15 |
| 4-4-4-4-4 | 30 | 4-4-4-4 | 20 | 4-4-4 | 10 |
| 3-3-3-3-3 | 30 | 3-3-3-3 | 20 | 3-3-3 | 10 |
| 2-2-2-2-2 | 15 | 2-2-2-2 | 10 | 2-2-2 | 5 |
| 1-1-1-1-1 | 15 | 1-1-1-1 | 10 | 1-1-1 | 5 |

2 or more 13 symbols trigger Bug Licking bonus.

3 or more 14 symbols trigger Down the Road bonus.

The Lucky Spot symbol is Wild and replaces any symbol except for scatter symbols 13, 14

The game will display a Lucky Spot with Lucky Multiplier from 2 to 5.

Any winning combination using the Lucky Spot will be multiplied by the multiplier value displayed on the Lucky Spot.

The Lucky Spot moves to a random location every spin.

Sam deposits $20 into the bill receptor and the Credits meter counts up from 0 to 400 since the denomination for this game is five cents per credit. Sam then chooses the wager for the game:

The game's Number of Pay Lines meter reads 1. Sam presses the Select Pay Lines button four times and the Number of Pay Lines meter counts up from 1 to 5. As Sam presses the Select Pay Lines button, the video display shows the locations of each selected pay line on the 5 column by 3 row matrix. For example, the first pay line starts in the middle row of the first column and proceeds in the straight line through the middle row of columns 2 through 5;

The game's Amount Bet Per Line meter reads 1. Sam presses the Bet Per Line button two times and the Amount Bet Per Line meter counts up from 1 to 3;

The Total Bet meter started at 1, but after Sam's adjustments it now reads 15; and The Paid meter reads 0.

After setting his wager, Sam presses the Spin Reels button. The Credits meter counts down from 400 to 385. The slot reels spin, the Lucky Spot symbols moves across the symbol matrix, the reels stop spinning and the Lucky Spot symbol stops on symbol position 2/1 and shows a 3× multiplier value. Using the numbers 1 to 14 to represent the symbol set, with 13 and 14 as the scatter symbols, the reels of the game display the following symbols:

| | | | | |
|---|---|---|---|---|
| 3 | <u>LS</u> | 6 | 7 | 5 |
| **4** | **4** | **4** | **4** | **4** |
| 6 | 6 | 1 | 9 | 7 |

(Lucky Spot indicated by <u>LS</u>.)
(Winning symbol combination in bold.)

The game awards Sam 90 credits for a winning symbol combination of 4-4-4-4-4 on pay line 1. The award reflects the game pay table which states that 4-4-4-4-4 pays 30 credits for each credit wagered upon the pay line; or 30 credits times 3 credits wagered by Sam on pay line 1. Note that the Lucky Spot was not used to form the winning combination, thus the award was not multiplied by the Lucky Spot multiplier value. The Credits meter counts up from 385 to 475 and the game Paid meter reads 90.

Again, Sam presses the Spin Reels button. The Credits meter counts down from 475 to 460. The slot reels spin, the Lucky Spot symbols moves across the symbol matrix, the reels stop spinning and the Lucky Spot symbol stops on symbol position 4/1 and shows a 5× multiplier value. Using the numbers 1 to 14 to represent the symbol set, with 13 and 14 as the scatter symbols, the reels of the game display the following symbols:

| | | | | |
|---|---|---|---|---|
| **6** | **6** | **6** | **<u>LS</u>** | 5 |
| 4 | 8 | 3 | 4 | 4 |
| 2 | 5 | 1 | 9 | 7 |

(Lucky Spot indicated by <u>LS</u>.)
(Winning symbol combination in bold.)

The game awards Sam 750 credits for a winning symbol combination of 6-6-6-LS on pay line 1. In this example, the Lucky Spot acts as a 6 symbol to form the 6-6-6-6 winning combination. The game pay table states that 6-6-6-6 pays 50 credits for each credit wagered upon the pay line; 50 credits times 3 or 150 credits. The Lucky Spot then multiplies this pay out by 5 since the Lucky Spot in this example, has a 5× multiplier; 150 time 5 or 750 credits. The Credits meter counts up from 460 to 1210 and the game Paid meter reads 750.

Content with his winnings, Sam presses the Cash Out button. The gaming device issues 1210 nickels or any other form of currency, including cash, an EZ-PAY™ ticket, or electronic payment.

Bonus Features. During play of the base games, the player may receive special pays for bonus features, such as wild symbols, traditional scatter pays and Vertical Scatter pays.

Wild Symbols. Wild symbols replace any or all other symbols in determining winning outcomes. Alternatively, wild symbols may only replace limited subsets of the other symbols. Wild symbols, therefore, increase the possibility of a player achieving winning combinations and the pay table must reflect that the wild symbols are in use. In a preferred embodiment of the present invention, the wild symbol acts as its own symbol (e.g., three wild symbols on a pay line) while at the same time a wild symbol could also replaces every other symbol. Alternatively, any suitable replacement rules for wild symbols could be used.

Each wild symbol may also be used to affect payouts which utilize one or more wild symbols. For example, wild symbol used in a winning combination of symbols, may double the value of the winning combination. The slot game can also be configured so that the wild symbols increase or decrease the value of any payout in any manner which results in an average value that can be utilized to control the gaming machine's overall average payouts. In the preferred embodiment of the present invention, the Lucky Spot acts as the Wild symbol and affect the value of the winning symbol combinations using a multiplier value.

Scatter Pays. A scatter pay awards the player a predetermined payout for the appearance of a scatter symbols, or combination of scatter symbols, anywhere on a pay line ("line scatter pays") or anywhere on the slot reels ("reel scatter pays"). Thus, if more than one scatter symbol is required to form a scatter pay, the scatter symbols in one embodiment of the invention, do not need to be located in adjacent positions.

Scatter pays award a specific number of credits and/or trigger a bonus feature, such as entertaining animations, free spins, enhanced pay table values, and/or selection of bonus object as described below in detail. The number of credits awarded may be determined by multiplying the total amount wagered by a random number within a predetermined range of numbers; or, the number of free spins awarded may be set by the number and/or arrangement of scatter symbols displayed on the reels. Alternatively, the value of the bonus feature could be determined by any other suitable calculation, such as a calculation or method where the bonus feature results in an average value that can be utilized to control the overall average payouts of the slot game.

The preferred embodiment of the present invention, utilizes two reel scatter pays:

Bug Licking: Any Frog symbol on the slot reels triggers an animated bonus event in which the Frog symbol licks any and all bug symbols displayed on the reels; each "licked" bug symbol pays one time the total wager.

Down the Road: Two or more truck symbols anywhere on the slot reels trigger an animated bonus game in which the player directs a frog down the road and back to the pond:

At the player's direction, the frog jumps into one of three traffic lanes;

With each jump, moves further down the road;

After each jump, one or more cars motor down one or more of the lanes;

If cars do not hit the frog, the player receives bonus credits for the successful jump.

If the cars hit the frog, the game ends and the player receives any accumulated bonus credits.

The player continues directing the frog down the road until the cars hit the frog or the frog reaches the pond after 7 successful jumps.

Bonus Feature Example. Sam Slotsky returns to the same nickel-denomination version of the preferred embodiment of the present invention, as described above in the Base Game Example section. Sam deposits $20 into the bill acceptor and the Credits meter counts up from 0 to 400. Sam then presses the Help button to view the rules of the game which state that there are three bonus features: Lucky Spot wild symbols with multiplier values and two scatter pays.

1) Lucky Spot:

The Lucky Spot symbol is Wild and replaces any symbol except for scatter symbols 13, 14

The game will display a Lucky Spot with Lucky Multiplier from 2 to 5.

Any winning combination using the Lucky Spot will be multiplied by the multiplier value displayed on the Lucky Spot.

The Lucky Spot moves to a random location every spin.

2) Bug Licking:

The first scatter pay is a traditional scatter concept which is triggered by any Frog symbol on the slot reels and award credits according to the following table:

Each Bug symbol . . . 1× Total Bet

3) Down the Road:

The second scatter pay is a traditional scatter concept which is triggered by two or more Truck symbols on the slot reels and award credits according to the following table:

Every Successful Jump . . . 1×-10× Total Bet

Return to Pond . . . 20× Total Bet

After reading the rules, Sam returns to the base game screen. Using the control buttons, Sam adjusts his wagers for the game; he sets the Number of Pay Lines at 9 and the Amount Bet Per Line at 2.

After setting his wagers, Sam presses the Spin Reels button. The Credits meter counts down from 400 to 382. The slot reels spin, the Lucky Spot symbols moves across the symbol matrix, the reels stop spinning and the Lucky Spot symbol stops on symbol position 1/3 and shows a 5× multiplier value. Using the numbers 1 to 14 to represent the symbol set, with 13 and 14 as the scatter symbols, the reels of the game display the following symbols:

| | | | | |
|---|---|---|---|---|
| 3 | 6 | **8** | 9 | 5 |
| 4 | **8** | 3 | 4 | 4 |
| **LS** | **2** | **2** | 9 | 7 |

(Lucky Spot indicated by LS.)
(Winning Symbol combination in bold.)

(Lucky Spot indicated by LS.)
(Winning Symbol combination in bold.)

The game awards Sam 250 credits for winning symbol combinations LS-2-2 on pay line 3 and LS-8-8 pay line 8. In this example, the Lucky Spot acts as a 2 symbol to form the 2-2-2 winning combination and as an 8 to form the 8-8-8 winning combination. The game pay table states that 2-2-2 pays 5 credits for each credit wagered upon the pay line, or 5 credits times 2 for a total of 10 credits; and 8-8-8 pays 20 credits for each credit wagered upon the pay line, 20 credits times 2 for a total of 40 credits. Together the winning combinations pay 50 credits, according to the game's pay table. The Lucky Spot, however, multiplies these pay outs by 5 since the Lucky Spot has a 5× multiplier; 50 times 5 for a total of 250 credits. The Credits meter counts up from 382 to 632 and the game Paid meter reads 250.

Sam again presses the Spin Reels button. The Credits meter counts down from 632 to 614. The slot reels spin, the Lucky Spot symbols moves across the symbol matrix, the reels stop spinning and the Lucky Spot symbol stops on symbol position 1/3 and shows a 5× multiplier value. Using the numbers 1 to 14 to represent the symbol set, with 13 and 14 as the scatter symbols, the reels of the game display the following symbols:

| | | | | |
|---|---|---|---|---|
| **1** | 2 | 7 | 5 | 5 |
| **4** | 5 | ***13**** | 3 | 8 |
| 6 | 6 | 7 | **4** | 7 |

(Bug symbols in bold.)
(Frog scatter symbol in *bold italic*.)

(Bug symbols in bold.)
(Frog scatter symbol in bold italic.)

The game awards Sam 72 credits for licking four bug symbols on the slot reels. The award reflects the game pay table which states that each bug symbols results in an award of one time the total bet; 18 credits times 4 bug symbols for a total of 72 credits. The Credits meter counts up from 614 to 686 and the game Paid meter reads 72.

Sam again presses the Spin Reels button. The Credits meter counts down from 686 to 668. The slot reels spin, the Lucky Spot symbols moves across the symbol matrix, the reels stop spinning and the Lucky Spot symbol stops on symbol position 1/3 and shows a 5× multiplier value. Using the numbers 1 to 14 to represent the symbol set, with 13 and 14 as the scatter symbols, the reels of the game display the following symbols:

| | | | | |
|---|---|---|---|---|
| ***14*** | 1 | 3 | 2 | 5 |
| 4 | 5 | 4 | 3 | 8 |
| 6 | 6 | 7 | 4 | ***14*** |

(Truck scatter symbols combination in *bold italic*.)

The game displays a second screen that shows a Frog sitting in the middle land of a three-lane road. The game instructs the player to direct the frog to one of the lanes (including the middle lane). Upon selection, the game displays the frog jumping and landing into the desired lane, and one or more cars speeding down the road. If the cars miss the frog, the player receives credits; if the cars hit the frog, the game ends and the player receives any accumulated credits. The player continues to direct the frog and collect credits until the cars hit the frog or the frog completes 7 successful jumps. For the purposes of this example, the frog jumps to the left-most lane, does not get hit by a car, and receives 36 credits; the frog jumps again to the rightmost lane, does not get hit by a car, and receives 180 credits; the frog then jumps into the middle lane and is hit by a car. The player collected 198 credits and, therefore, the Credits meter counts up from 668 to 866 and the game Paid meter reads 198.

Content with his winnings, Sam presses the Cash Out button. The gaming device issues 866 nickels or any other form of currency, including cash, an EZ-PAY™ ticket, or electronic payment.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

Having thus described our invention, what we claim as new and desire to secure by Letters Patent is as follows:

1. A method of conducting a wagering game on a gaming system having a display, a wager input device, and at least one controller configured to execute instructions relating to the wagering game, the method comprising:

assigning to a plurality of symbol positions in an array of symbol positions at least one pre-defined attribute via the controller, the at least one pre-defined attribute comprising a probability defined by a probability schedule;

receiving a monetary wager from a player via the wager input device associated with the gaming system;

converting the monetary wager into an opportunity for the player to play the wagering game on the gaming system;

initiating the wagering game on the gaming system;

generating a random number using a random-number generator configured to output random numbers;

correlating the random number output by the random-number generator to a wagering-game outcome using the controller;

displaying a representation of the wagering game outcome via the display, the representation of the wagering game outcome comprising the array of symbol positions, each symbol position in the array of symbol positions comprising a randomly-generated symbol;

designating a randomly selected one of at least one of the symbol positions in the array of symbol positions as a lucky spot according to the probability schedule via the controller, the designating occurring without regard to the symbols that fill the array;

determining whether the wagering-game outcome corresponds to a predefined winning outcome or a losing outcome using the controller; and converting the winning outcome, if any, into an award for the filled array according to a pay table and according to the lucky spot.

2. The method of claim 1, wherein the act of designating comprises designating a randomly selected one of at least one of the symbol positions as a lucky spot for every play of the wagering game.

3. The method of claim 1, wherein the lucky spot is evaluated as a wild.

4. The method of claim 1, wherein the designating step designates only one of the symbol positions as a lucky spot.

5. The method of claim 4, wherein the lucky spot is associated with a multiplier, the award according to the pay table is multiplied by the multiplier.

6. The method of claim 5, wherein the multiplier has a variable value.

7. The method of claim 6, wherein the variable value is randomly determined.

8. The method of claim 1, wherein the probability schedule requires that each of the plurality of symbol positions comprise a non-zero probability.

9. The method of claim 8, wherein the probability schedule requires that at least two of the plurality of symbol positions comprise a different probability.

10. The method of claim 1, wherein the lucky spot is associated with a multiplier and is also evaluated as a wild.

11. The method of claim 1, wherein the designating step occurs after the displaying step.

12. The method of claim 1, wherein the designation step is performed by a player prior to the displaying step.

13. The method of claim 1, wherein the lucky spot affects the award if the lucky spot forms part of a line pay, scatter pay, or other pay.

14. The method of claim 1, wherein the lucky spot affects the award by providing extra credits, a multiplier, a free game, or a bonus feature.

15. The method of claim 1, wherein the lucky spot is designated for more than one play of the wagering game.

16. The method of claim 1, wherein the steps are performed in a base game.

17. The method of claim 1, wherein said lucky spot designated in said act of designating is not limited to any particular symbol position or set of pre-defined symbol positions in said array of symbol positions.

18. The method of claim 1, wherein said step of designating comprises randomly designating at least one of the symbol positions in said array of symbol positions, selected from a population of all array symbol positions, as a lucky spot.

19. A method of conducting a wagering game on a gaming system having a display, a wager input device, and at least one controller configured to execute instructions borne by a computer readable media, the instructions causing the gaming system upon execution of the instructions by the controller to perform steps comprising:

assigning to a plurality of symbol positions in an array of symbol positions at least one pre-defined attribute, the at least one pre-defined attribute comprising a probability defined by a probability schedule, the probability schedule requiring that at least two of the plurality of symbol positions comprise a different probability;

converting a monetary wager received from a player via the wager input device into an opportunity for the player to play the wagering game on the gaming system;

initiating a wagering game on the gaming system;

displaying the array of symbol positions via the display;

filling the array of symbol positions with randomly-generated symbols;

designating a randomly selected one of at least one of the symbol positions in the array of symbol positions as a lucky spot according to the probability schedule, the symbol in the lucky spot being a wild that substitutes for one or more of the symbols, the designating step occurring without regard to the symbols that fill the array and without regard to a location of the designated symbol position within said array;

awarding an award to the player for the filled array according to a pay table; and enhancing the award according to the lucky spot.

20. The method of claim 19, wherein the pay table includes a number of predefined winning combinations of symbols.

21. The method of claim 20, wherein the enhancing step enhances the award for a winning combination if the lucky spot is included in the winning combination.

22. The method of claim 21, wherein the lucky spot is associated with a multiplier, the enhancing step multiplying the award by the multiplier.

23. The method of claim 22, wherein the multiplier has a variable value.

24. The method of claim 23, wherein the variable value is randomly determined.

25. The method of claim 19, wherein the designating step randomly designates at least one of the symbol positions as a lucky spot.

26. The method of claim 19, wherein the steps are performed in a base game.

27. A gaming apparatus for conducting a wagering game, comprising:

a value input device for receiving a wager from a player to play the wagering game;

a display for displaying an array of symbol positions; and a controller operative to assign to each of the symbol positions in the array at least one pre-defined attribute, the at least one pre-defined attribute comprising a probability defined by a probability schedule;

cause the display to fill the array of symbol positions with randomly-generated symbols;

cause the display to designate a randomly selected one of at least one of the symbol positions in the array of symbol positions as a lucky spot according to the probability schedule and without regard to the symbols that fill the array; and award an award for the filled array according to a pay table and according to the lucky spot.

28. The apparatus of claim 27, wherein the display includes a plurality of symbol-bearing reels, the controller being operative to rotate and stop the plurality of symbol-bearing reels to place the symbols on the reels in visual association with the array.

29. The apparatus of claim 27, wherein the controller evaluates the lucky spot as a wild.

30. The apparatus of claim 27, wherein the controller causes the display to designate only one of the symbol positions as a lucky spot.

31. The apparatus of claim 30, wherein the lucky spot is associated with a multiplier, the award according to the pay table is multiplied by the multiplier.

32. The apparatus of claim 31, wherein the multiplier has a variable value.

33. The apparatus of claim 32, wherein the variable value is randomly determined.

34. The apparatus of claim 27, wherein the controller causes the display to randomly designate at least one of the symbol positions as a lucky spot.

35. The apparatus of claim 34, wherein a probability of designating different ones of the symbol positions varies.

36. The apparatus of claim 27, wherein the display designates the lucky spot with a symbol, text, highlight, or outline drawn around an edge thereof.

37. The apparatus of claim 27, wherein the controller causes the display to designate at least one of the symbol positions as a lucky spot after causing the display to fill the array of symbol positions with randomly-generated symbols.

38. The apparatus of claim 27, wherein the controller causes the display to designate at least one of the symbol positions as a lucky spot in response to player input.

39. The apparatus of claim 27, wherein the lucky spot affects the award if the lucky spot forms part of a line pay, scatter pay, or other pay.

40. The apparatus of claim 27, wherein the lucky spot affects the award by providing extra credits, a multiplier, a free game, or a bonus feature.

41. The apparatus of claim 27, wherein the lucky spot is designated for each and every play of the wagering game, every other play of the wagering game, or a group of plays of the wagering game.

42. The method of claim 27, wherein said controller is configured to perform the aforementioned acts of causing the display to fill the array, causing the display to designate, and awarding an award in a base game.

43. The gaming apparatus of claim 27, wherein said controller is operative to cause the display to randomly designate at least one of the symbol positions in said array of symbol positions, selected from a population of all array symbol positions, as a lucky spot.

* * * * *